(12) United States Patent
Whitted et al.

(10) Patent No.: US 7,414,623 B2
(45) Date of Patent: Aug. 19, 2008

(54) ADAPTIVE SAMPLING FOR PROCEDURAL GRAPHICS

(75) Inventors: J. Turner Whitted, Carnation, WA (US); James T. Kajiya, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 340 days.

(21) Appl. No.: 11/171,954

(22) Filed: Jun. 29, 2005

(65) Prior Publication Data

US 2007/0002068 A1 Jan. 4, 2007

(51) Int. Cl.
*G06T 17/00* (2006.01)
(52) U.S. Cl. ........................................ 345/420; 345/586
(58) Field of Classification Search .................. 345/420, 345/586
See application file for complete search history.

(56) References Cited

U.S. PATENT DOCUMENTS

| | | | |
|---|---|---|---|
| 5,903,458 A * | 5/1999 | Stewart et al. ................. 700/98 |
| 5,977,977 A | 11/1999 | Kajiya et al. |
| 6,046,744 A | 4/2000 | Hoppe |
| 6,292,192 B1 * | 9/2001 | Moreton ..................... 345/586 |
| 6,606,092 B2 | 8/2003 | Driemeyer et al. |
| 7,050,955 B1 * | 5/2006 | Carmel et al. ................... 703/6 |
| 2002/0003541 A1 | 1/2002 | Boyd et al. |
| 2003/0164823 A1 | 9/2003 | Baldwin et al. |
| 2003/0194057 A1 | 10/2003 | Dewaele |

OTHER PUBLICATIONS

Amburn et al., "Managing Geometric Complexity with Enhanced Procedural Models", 1986, ACM, pp. 186-195.*
Grossman et al., "Point Sample Rendering," In *Rendering Techniques '98*, 1998, pp. 181-192.
Olano, "A Programmable Pipeline for Graphics Hardware," PhD thesis, Dept. of Computer Science, The University of North Carolina at Chapel Hill, 1988, pp. 1-80.
Olano et al., "A Shading Language on Graphics Hardware: The PixelFlow Shading System," Proceedings of Siggraph 98, Jul. 1998, pp. 1-10.
Buck et al., "Brook for GPUs: Stream Computing on Graphics Hardware," In *ACM Transactions on Graphics*, 23(3):777-786, Aug. 2004.
Buck et al., "Data Parallel Computation on Graphics Hardware," In *Graphics Hardware 2003*, Jul. 2003, 9 pages.
Catmull, "A Subdivision Algorithm for Computer Display of Curved Surfaces," *Ph.D Thesis*, Dept. of CS, U. of Utah, Dec. 1974, 84 pages.
Cook et al., "The Reyes Image Rendering Architecture," In *Computer Graphics*, vol. 21, No. 4, Jul. 1987, pp. 95-102.
Cook, "Shade Trees," In *Computer Graphics*, vol. 18, No. 3, Jul. 1984, pp. 223-231.

(Continued)

*Primary Examiner*—Almis Jankus
(74) *Attorney, Agent, or Firm*—Klarquist Sparkman, LLP

(57) ABSTRACT

Techniques and tools for rendering procedural graphics are described. For example, an architecture is provided which allows evaluation of geometric, transform, texture, and shading procedures locally for a given set of procedure parameter values. This evaluation is performed in parallel for different parameter values on a single-instruction, multiple-data array to allow parallel processing of a procedure set. In another example, a sampling controller is described which selects sets of parameter points for evaluation based on information in tag maps, rate maps, and parameter maps.

15 Claims, 8 Drawing Sheets

Procedural Graphics Architecure

OTHER PUBLICATIONS

Deering et al., "The Sage Graphics Architecture," In *ACM Transactions on Graphics 21*, Jul. 3. 2002, pp. 683-692.

Goldfeather et al., "Quadratic Surface Rending on a Logic-Enhanced Frame-Buffer Memory," In *IEEE Computer Graphics and Applications 6*, Jan. 1, 1986, pp. 48-59.

Gu et al., "Geometry Images," In *ACM Transactions on Graphics 21*, Jul. 3, 2002, pp. 355-361.

Hanrahan et al., "A Language for Shading and Lighting Calculations," In *Computer Grahics*, vol. 24, No. 4, Aug. 1990, pp. 289-298.

Levoy et al., "The Use of Points as a Display Primitive," *Technical Report TR 85-22*, The University of North Carolina at Chapel Hill, 1985, 19 pages.

Lien et al., "Adaptive Forward Differencing for Rendering Curves and Surfaces," In *Computer Graphics*, .vol. 21, No. 4, Jul. 1987, pp. 111-118.

Loop et al., "Resolution Independent Curve Rendering Using Programmable Graphics Hardware," In *ACM Transactions on Graphics (Siggraph 2005 Proceedings)*, Jul. 2005, pp. 1000-1009.

McCool et al., "Shader Algebra," In *ACM Transactions on Graphics*, vol. 23, No. 3, Aug. 2004, pp. 787-795.

McCool et al., "Texture Shaders," In *Proceedings of the ACM Siggraph/Eurographics Workshop on Graphics Hardware*, 1999. pp. 117-126.

Molnar et al., "A Sorting Classification of Parallel Rendering," In *IEEE Computer Graphics and Applications 14*, Jul. 4, 1994, 10 pages.

Molnar et al., "Pixelflow: High-Speed Rendering Using Image Composition," In *Proceedings of Siggraph 92, Computer Graphics*, vol. 26, No. 2, Jul. 1992, pp. 231-240.

Newell, "*The Utilization of Procedure Models in Digital Image Synthesis*," PhD thesis, Dept. of Computer Science, University of Utah, 1975, 109 pages.

Owens et al., "Polygon Rendering on a Stream Architecture," In *Proceedings of the 2000 Siggraph/Eurographics Workshop on Graphics Hardware*, Aug. 2000, pp. 23-32.

Perlin, "An image synthesizer," In *Computer Graphics (Siggraph '85 Proceedings)*, vol. 19, No. 3, 1985, pp. 287-296.

Rhoades et al., "Real-Time Procedural Textures," In *Computer Graphics (1992 Symposium on Interactive 3D Graphics)*, vol. 25, 1992, pp. 95-100.

Rixner et al., "A Bandwidth-Efficient Architecture for Media Processing," In *International Symposium on Microarchitecture*, 1998, pp. 3-13.

Snyder et al., "Generative Modeling: A Symbolic System for Geometric Modeling," In *Computer Graphic*, vol. 26, No. 2, Jul. 1992, pp. 369-378.

Whitted et al., A Software Test-Bed for the Development of 3-D Raster Graphics Systems, In *Computer Graphics*, vol. 15, No. 3, Aug. 1981, pp. 271-277.

International Search Report and Written Opinion dated Apr. 23, 2007 for PCT/US06/25415 (filed Jun. 28, 2006), 11 pages.

Elliott, "Programming Graphics Processors Functionally," 2004, ACM, pp. 45-56.

* cited by examiner

Fig. 1, prior art

ADAPTIVE SAMPLING FOR PROCEDURAL GRAPHICS

BACKGROUND

The evolution of graphics rendering technology has led to the development of procedural techniques for describing various steps in the rendering process. Procedural geometry is useful as a mechanism for producing arbitrarily complex geometry from compact descriptions. For a simple example, a cube object can be represented passively, as a polygonal representation comprising a list of eight vertexes and six sides. However, a more—compact, procedural representation can be developed where the cube becomes the result of a cube-generating procedure, which needs as input only position coordinates and a size. Thus, geometric procedures often provide a useful, compact way to represent shapes, avoiding the access and transfer of many points of data. More complex procedures, such as rotations or splines, offer even greater compression of data. Other processes, such as shading and texture also take advantage of procedural techniques. Indeed, programmable procedural shaders are seen by some as the most efficient way to represent complex material properties.

However, conventional graphics display or graphics processor unit ("GPU") architectures enforce a divide between procedural geometry and procedural appearance (such as procedural shaders and texture) by means of a processing chain that operates on fixed, passive polygonal primitives. A common approach is to relegate procedural geometry to the pre-rasterization stages, to expand the procedures into polygons, and to devote a large amount of bandwidth to feeding polygons to the transformation and setup stages of the graphics processor.

One example of these traditional techniques is shown in FIG. 1, which illustrates a simplified overview of a traditional GPU architecture. A display list 100, which may contain a combination of passively described geometry and procedural geometry, is input into vertex shaders 110, which generate polygonal representations of the geometric forms. These geometric forms are then input into a rasterizer, which interpolates the polygons and samples them to develop a sample set of points in image space, which can then be shaded and have texture added to them. These points are then passed to a series of pixel shaders 130, which may or may not be programmable, and which utilize parallel computing techniques to perform shading of the points. Additionally, the pixel shaders will sometimes add textures, which are kept in graphics memory 150 and cached in texture cache 140, to the image points. Once these processes are complete, the image points can then be placed in a frame-buffer 160 before being transferred to graphics memory 150.

However, as mentioned above, because geometric procedures are converted into polygons and then into a list of points in an image by the rasterizer, compact procedural graphics information tends to be compromised early-on in lieu of expanded sets of surface points. This can be beneficial when processing power is so low that it is desirable, from a resource and time perspective, to compute geometric procedures only once for each shape. However, as GPU processors are ever-increasing in power and efficiency, these processing concerns become smaller and smaller.

SUMMARY

Various techniques and systems for graphics processing are described herein. As the processing power of GPUs increases, rather than being limited by processing power, GPU architecture performance is often becoming limited by external data transfer bandwidth to the architectures. Not only are procedural graphics representations beneficial in the first place, it may be desirable to delay the expansion of geometric procedures until later in the rendering process. This can help prevent the needless proliferation of surface points though an architecture when more compact, procedural forms are available. Various techniques and systems described herein maintain procedural representations of graphical objects for a longer time within GPU architectures. Various techniques and systems described herein help reduce extraneous data transfer bandwidth to a GPU. Additionally, various techniques and systems described herein provide adaptively-sampled parameter sets which are used as input to procedures in the rendering process. The described tools and techniques include, but are not limited to, the following.

A tool generates a set of adaptively sampled parameter points to be used in rendering one or more procedural graphics routines as follows. The tool evaluates the one or more procedural graphics routines for parameter points in a sparse set of parameter points in a parameter domain. The tool then analyzes results of the evaluation to determine information to be used in selecting the set of adaptively sampled parameter points.

Or, a tool comprises a sampling controller for adaptively sampling graphics procedures. The tool is configured to select a first set of parameter tuples to be used as input in a first pass of evaluating one of the graphics procedures. The tool is also configured to generate a second set of parameter tuples based upon the received results upon receiving results of evaluation of the first set.

Or, a graphics processing unit is configured to render an image defined by a series of one or more graphics procedures taking parameters as input. The graphics processing unit comprises a processing module and a sampling controller. The sampling controller is configured to instruct the processing module to compute according to a graphics procedure from the series of one or more graphics procedures on a sparse set of parameters. The sampling controller is also configured to generate a rendering set of parameters based at least in part upon output of the processing module.

The various techniques and systems can be used in combination or independently.

Additional features and advantages of the invention will be made apparent from the following detailed description of embodiments that proceeds with reference to the accompanying drawings.

DETAILED DESCRIPTION

The following description is directed towards systems and techniques for rendering graphics. In an architecture for some systems and techniques, a representation remains procedural later within the display processor chain. For example, the architecture is configured to defer the data amplification of compact geometric procedures to the point where they can be merged with transform, texture, and shading computation. In this way, geometry, transform, texture, and shading are executed in combination and locally, which takes advantage of the parallelism of most graphics processors. Additionally, by maintaining locality in the computation and deferring expansion of procedural geometry, external data bandwidth costs are lowered. In another example, sampling of the procedural graphics is performed by a programmable sampling controller, which analyzes the procedures to create maps denoting information about the procedures, which can in turn be used to generate sets of sample parameters to be used in the rendering itself.

The techniques and systems described herein will sometimes be described with reference to hardware or software or programs generally, and other times with reference to methods or functions. This usage is meant for the sake of simplicity of description, and should not be taken to imply any particular limitations on the techniques and systems described herein. It will be recognized that the techniques and systems described herein may apply to various levels of software and hardware abstraction, including programs, methods, functions, routines, or other parts of software systems, circuits or other parts of hardware systems, or various parts of combined hardware/software systems. Moreover, any given technique or system described herein does not necessarily address any or all of the deficiencies noted in the Background, nor does it necessarily satisfy any or all of the features noted in the Summary.

I. EXAMPLE PROCEDURAL GRAPHICS ARCHITECTURE

Figure 1:
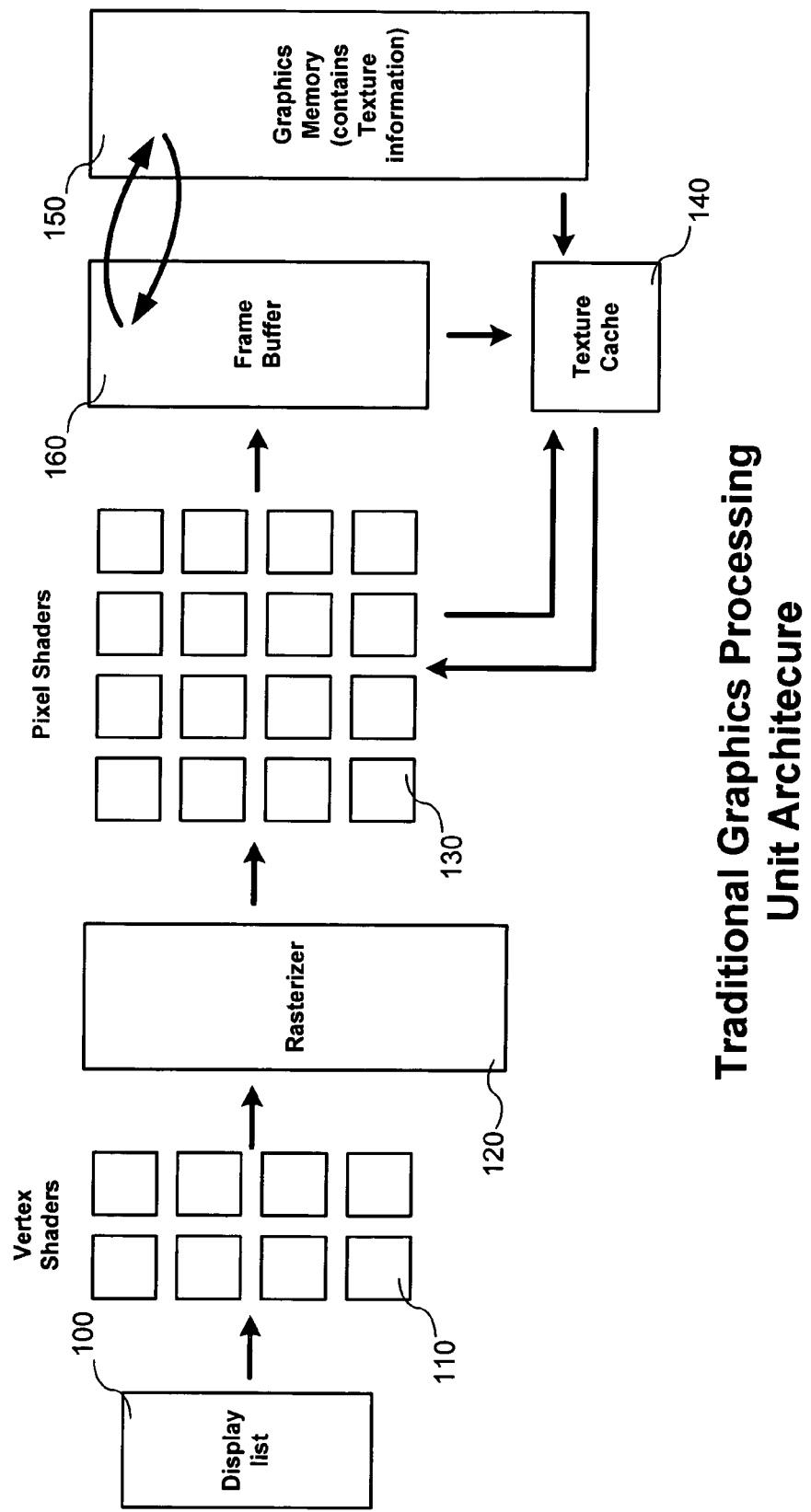
FIG. 1 is a block diagram of a prior art graphics processing unit architecture.
Figure 2:
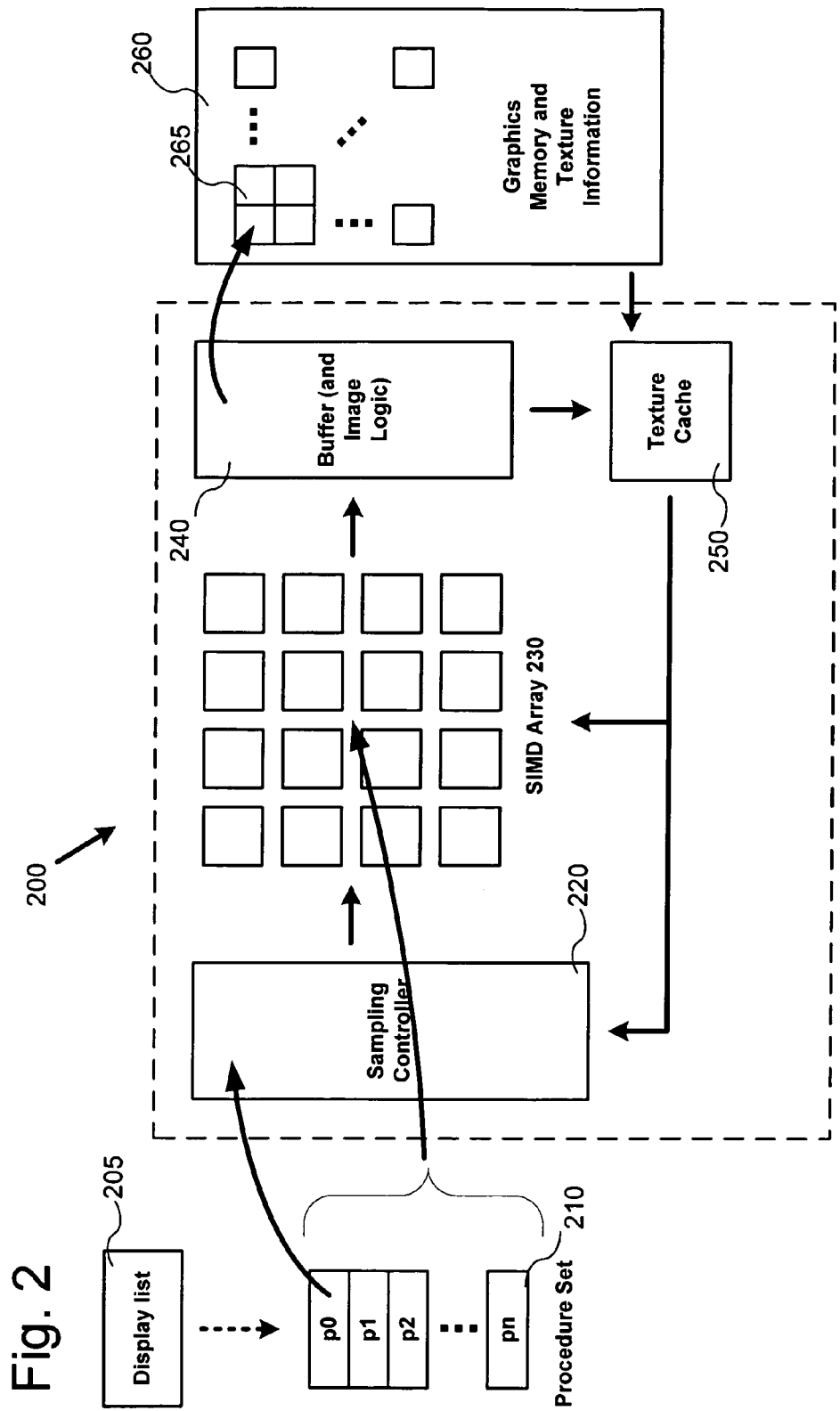
FIG. 2 is a block diagram of a procedural graphics architecture.

FIG. 2 illustrates a block diagram of a procedural graphics architecture 200 which in some embodiments interacts with a display list 205 containing a procedure set 210 and a graphics memory 260 according to techniques described herein. As will be elaborated, one chief difference between the GPU architecture 200 and a traditional architecture is a single single-instruction, multiple-data ("SIMD") processor array 220, which are used in evaluation of geometric procedures and other graphical procedures (e.g., shading and texture (and possibly transform) graphical procedures) as a combined process, rather than splitting the work between two or more sections of the architecture. Another noticeable difference between the traditional GPU architecture and the procedural graphics architecture 200 is that the architecture 200 does not contain a rasterizer. Instead, the two functions of a conventional rasterizer, interpolation and sampling, are split in the illustrated architecture 200. The sampling portion of a conventional rasterizer is in effect replaced by the programmable sampling controller 220. One example of a process in which the programmable sampling controller 220 chooses sample positions that adequately map to image space is discussed below with reference to FIGS. 6 and 7. Interpolation of a conventional rasterizer, in contrast, is in effect replaced by evaluation (e.g., with the eval( ) methods described below) of the procedures at each sample point which is evaluated.

FIG. 2 illustrates a display list 205, which comprises information for various surfaces for display. The display list 205 may contain simple passive shapes, such as those pre-defined as a simple list of polygons, or even such complex passive geometric representations as those encoded within textures which require the use of texture mapping hardware to convert to geometry. In FIG. 2, the display list 205 also comprises a set of procedures 210. For example, the set of procedures 210 is represented as arrays of arrays of code, with each piece of code representing a part of an object, and each array of code representing an object. Alternatively, the set of procedures 210 is represented using some other data structure. In one implementation, the code is implemented as eval( ) methods as described below. Alternatively, the code is implemented according to some other organization or form. The eval( ) methods can be coded in C#, or they can be coded in some other software language that is interpreted or compiled. In general, the procedures 210 accommodate constraints familiar to graphics programmers, such as constraints disallowing loops but allowing conditional execution, or disallowing inter-processor communication; alternatively these constraints are not accommodated.

Once received by the architecture, arrays of procedures are traversed and broadcast both to the SIMD array 230 and the programmable sampling controller 220. In one implementation, the SIMD array 230 contains numerous arithmetic logic units ("ALUs"), similar to conventional fragment shaders. The array 230 is described as a SIMD array, meaning that at a given time each ALU of the SIMD array can be used to perform, on its assigned parameter values, the same instruction for a graphics procedure as the other ALUs of the SIMD array. Parameter values are discussed in greater detail below. This effectively allows the architecture to perform the same graphics procedures on many pieces of data in parallel. In the architecture shown in FIG. 2, the SIMD array 230 also is able to pull texture information, which is contained in the graphics memory 260, from a texture cache 250. Alternative implementations may use multiple-instruction, multiple-data ("MIMD") arrays. Additionally, the ALUs of a SIMD array can be configured to act autonomously, in order to cut down on data transfer and the attendant bandwidth problem.

When eval( ) methods are evaluated with the SIMD array, the eval( ) methods of the procedure set 210 are executed in the SIMD array one after another. Typically, these methods take parameter values as arguments, return no values, and leave their results in registers, in order to lessen data bandwidth usage. As an example, a complete procedural object can be implemented much like a multipass shader except that intermediate results remain in registers and are not written to external memory. At the completion of execution pre-defined register values are transferred to the buffer 240.

The programmable sampling controller 220 also analyzes the procedures in procedure set 210 and then adaptively steps through the parameter domain for each procedural surface and feeds parameter values to the SIMD array 230. The code to be executed in the programmable sampling controller can be prepended to the array of eval( ) methods gained from procedure set 210. In another, the sampling controller uses a sampling method which is hard-coded into its logic. The sampling controller can use texture information from the graphics memory 260, via the texture cache 250, in order to produce sample sets. When two-pass sampling is used, in a rendering pass the sampling controller uses sampling rate information produced in an earlier, sampling pass. Alternatively, the sampling controller uses other sampling information in a rendering pass.

In architectures that use tiles, an image plane is divided into tiles, which generally facilitates moving data to and from external graphics memory 260 in blocks. The sampling controller 220 can be configured to create sample sets and otherwise evaluate graphics procedures according to image tiles, in order that a single tile can be rendered at a time, facilitating block transfer from the buffer 240 to graphics memory 260. Alternatively, the sampling can be configured to process graphics procedures (e.g., sampling, rendering) for an entire image.

As FIG. 2 illustrates, after computation, the output image is locally buffered in a buffer 240 before being placed into graphics memory 260. In an architecture that uses image tiling, the buffer 240 is a tile buffer and the graphics memory 260 organizes the image as tiles 265, each of the tiles representing a rectangular subset of the full image. In one implementation, each of the tiles, as represented in the tile array, maps to a 64×64 pixel portion of the final image, and there is uniform over-sampling in each dimension by a factor of 4:1 such that the array is 256×256 (not considering padded addresses at the edges). Additionally, the buffer may contain padding in order to accommodate anti-aliasing procedures implemented in the image logic of the buffer 240. In alternative implementations, different tile configurations, as well as different image logic, may be implemented in the buffer 240. Oftentimes, using this architecture, since sample points are not necessarily generated at pixel centers and because they are generated according to parameter points, they are not necessarily written to image memory in any coherent order, for reasons described below. Thus, some means for routing samples to destinations is provided in the local memory. For example, each processor in the SIMD array is able to write to an arbitrary pixel (commonly known as a scatter operation), and the buffer 240 includes a routing network for the write operations as well as additional hardwired pixel logic for traditional graphics rendering processes such as z-buffering, filtering and decimation, anti-aliasing, and texture caches.

Details such as image tile size and the number of ALUs in the SIMD array depend on implementation. In one case, the image tile size and number of ALUs in the SIMD array are derived from estimates of what would fit on a die 15 mm on edge in a 90 nm CMOS process, where the controller 220, the SIMD array 230, the buffer 240, and the cache 250 fit on a single chip. Alternatively, other constraints or determinations are used.

As for buffer size, in some implementations the buffer includes enough storage for two tiles. While ALUs of the SIMD array write values for one tile, another tile can be filtered and read to external memory. Alternatively, the buffer has another size.

II. EXAMPLE USAGE OF PARAMETER POINTS

Figure 3:
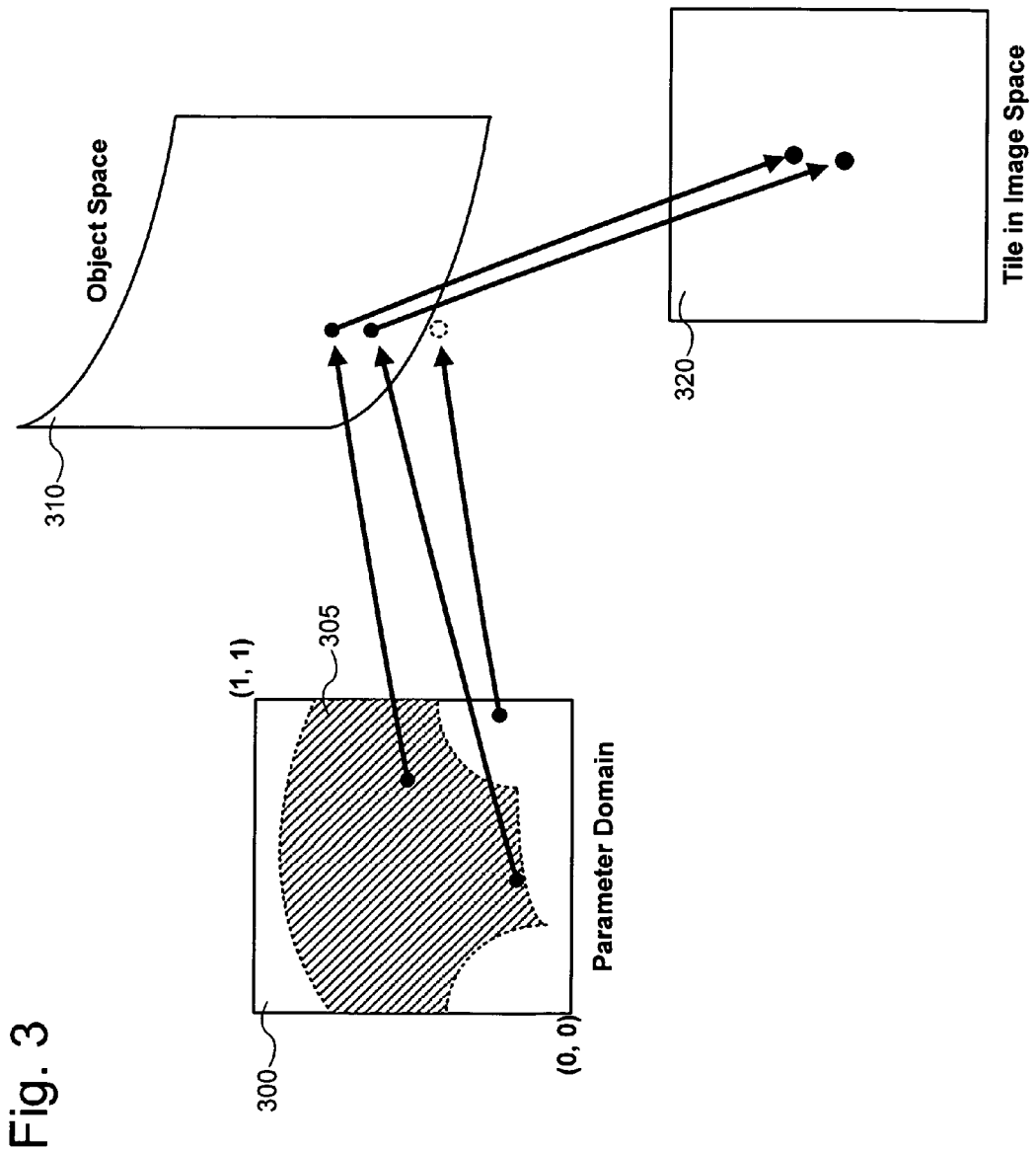
FIG. 3 is a representation of a mapping of parameters from a parameter domain to an object space and then to an image space.

FIG. 3 is a block diagram illustrating one example of why the procedural architecture 200 is configured to write to arbitrary locations within a tile. FIG. 3 illustrates a parameter domain 300, which shows an example of a two dimensional representation of a parameter space for a pair of parameters (u, v) for an example geometric procedure, where each parameter is normalized to the scale of 0 to 1. For example, if a procedure were to define the sides of a cylinder, any point on those sides could be defined as a pair of numbers, with one number being the height up the side of the cylinder, and the other being an amount of rotation around the center line of the cylinder. (Other details of the cylinder such as total height and radius would be set in the geometric procedure itself.) While different geometric procedures may have fewer or more than two parameters, generally, a point on the surface of an object described by a procedure can be described as a tuple of 2 or more parameter values. Because these values may or may not have an exact meaning in the physical world, and because movement within parameter space may be non-linear in object or image space, the term "parameter" is used instead of a more geometric term, such as "coordinates."

As FIG. 3 illustrates, two points that are shown in the parameter domain map to 3D surface points on an object's surface, in object space, a portion of which is shown as object space 310. (In a global coordinate space, this object space would be where the cylinder is located in the scene shown by the image being rendered.) The points in object space are then rendered as 2D points in an image, as illustrated by the mapping to a tile in image space 320. The two points also illustrate a difference between parameter points and mapped object or image points, as the two parameter points are not very close together in the parameter domain 300, but map to relatively close points in object space and image space.

When image tiling is used, the whole image space is divided into tiles, as discussed above, which in turn can affect which portions of object space and parameter domain map to a particular tile. Thus, FIG. 3 illustrates that only a portion of the object space falls within the tile in image space 320, and thus that portion is shown. And because in rendering the tile, only portions of the object space are of concern, it can be useful to track which portions of the parameter domain map to that section in the image domain. Thus, FIG. 3 also illustrates a shaded section of the parameter domain 305, which represents the points in the parameter domain that map to a point in the portion of object space 310 which is shown in FIG. 3. This is demonstrated further by the illustrated parameter point which is outside of the shaded section 305. As FIG. 3 shows, this parameter point does not map to a point in object space which is in the portion mapped within the tile 320. This distinction between points in a parameter domain which are known to map to a tile and points in the parameter domain which are known not to map to a tile will be discussed more below with respect to sampling procedures.

III. EXAMPLE RENDERING PROCESSES

Figure 4:
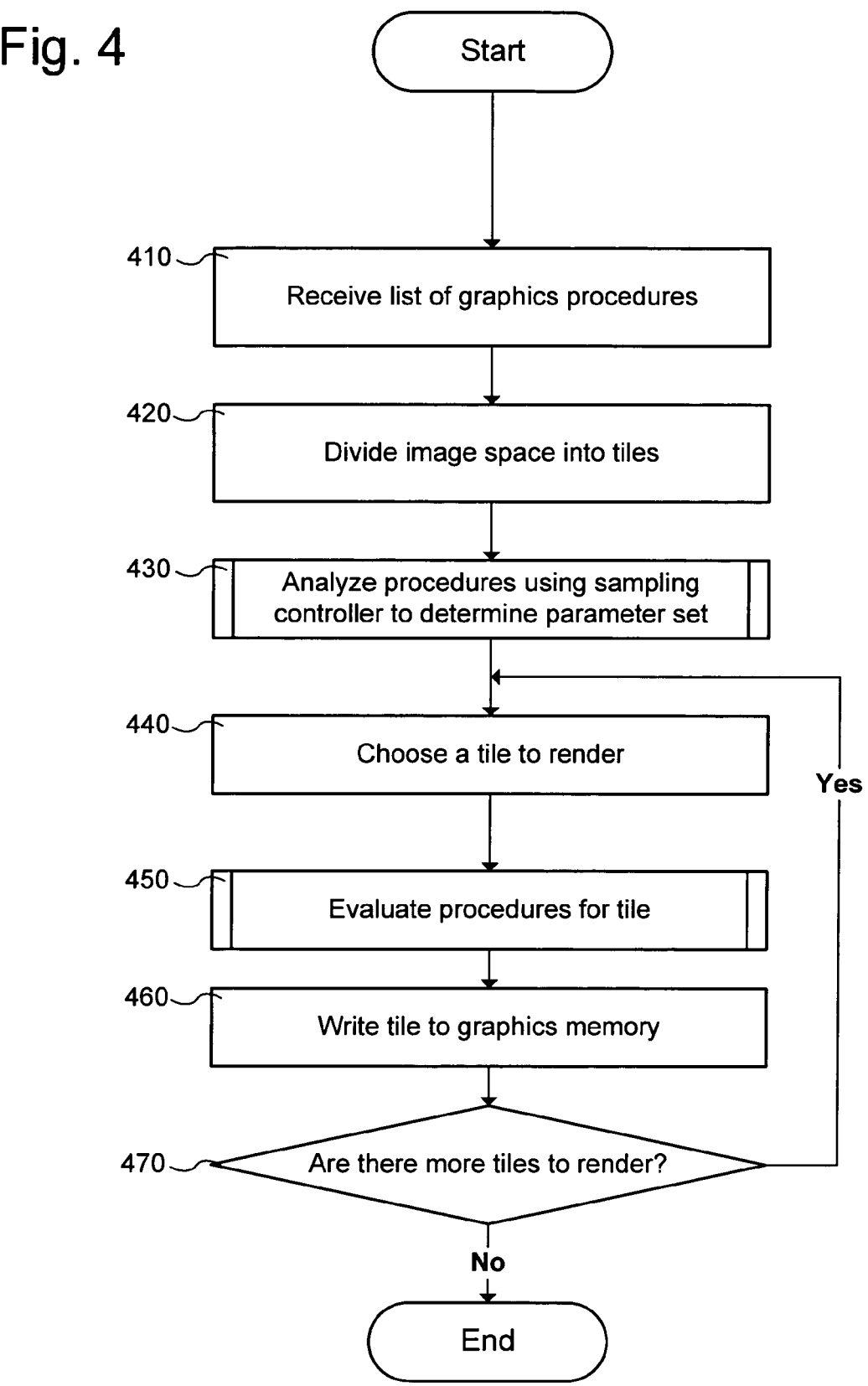
FIG. 4 is a flowchart illustrating a process performed in the procedural graphics architecture of FIG. 2 for rendering an image.

FIG. 4 is a flowchart illustrating one example of a process for rendering graphics using the procedural graphics architecture 200. In various embodiments, blocks illustrated in FIG. 4 may be combined, broken into sub-blocks, or omitted, and the ordering of blocks may be modified. The procedural graphics architecture 200 of FIG. 2 performs the process. Alternatively, another tool performs the process.

The process begins at block 410 where a list of graphics procedures is received by the architecture. In one implementation, as described above, this list received as an array of arrays of graphics procedures. Additionally, passive graphics representations may also be received at block 410.

Next, at block 420, the image space is divided into tiles. For example, this is done according to the hardware capabilities of the buffer 240; or, tile size may be determined at rendering time, with the tile buffer large enough to handle most likely tile sizes. In some scenarios, the tile is chosen with reference to the size of the image space, to ensure the image space is properly divided up.

Next, at block 430, the procedures in the procedure list are analyzed to determined a set of parameter points which will be used for the rendering. One example of such a procedure is described in greater detail below with reference to FIGS. 6 and 7. In general, the set of parameter points is selected so that resulting geometry points are adequate for the desired level of detail, but not too dense (which would mean wasted computation for that level of detail). Thus, many close parameter points could be selected for rendering in one area of the parameter space, with more widely spaced parameter points selected for rendering in another area of the parameter space.

Next, a tile is chosen to render at block 440. Depending on the method used, tiles may be chosen sequentially, according to a hierarchy, or according to available processor resources. In an alternative implementation, the tile is chosen before the process of block 430, in which case the sampling process of block 430 is repeated for each tile.

The process continues at block 450, where the graphical procedures are evaluated for the particular tile. One example of this evaluation is described below with reference to FIG. 5.

Next, the process writes the tile to graphics memory at block 460. For example, once the procedures for the tile have been evaluated, the information for resulting image samples is written to image locations in a tile buffer.

The process then determines, at decision block 470, if there are additional tiles to render. If so, the process returns to block 440 and repeats. If not, the process ends.

While FIG. 4 shows procedural evaluation and rendering on a tile-by-tile basis, alternatively, a GPU architecture evaluates procedures for an entire, untiled image.

Figure 5:
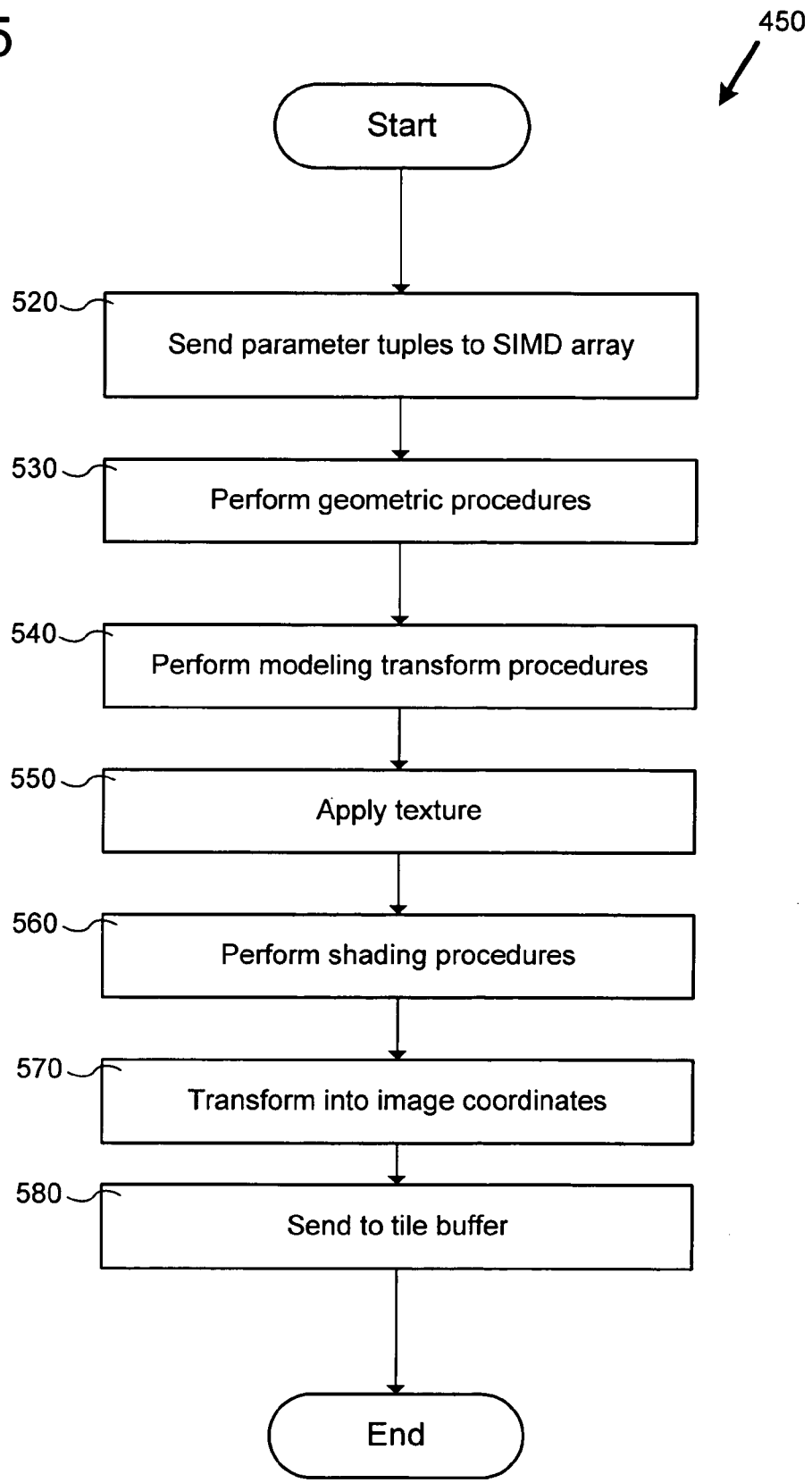
FIG. 5 is a flowchart illustrating a process performed in the procedural graphics architecture of FIG. 2 for evaluating graphics procedures.

FIG. 5 is a flowchart illustrating one example of a process for evaluating graphical procedures using the procedural graphics architecture 200. As such, the process of FIG. 5 is one example of a process for implementing block 450 of FIG. 4. In various embodiments, blocks illustrated in FIG. 5 may be combined, broken into sub-blocks, or omitted, and the ordering of blocks may be modified. The SIMD array 230 of FIG. 2 is used to perform the process. Alternatively, another tool performs the process. In the context of FIG. 4, the process of FIG. 5 is performed for each tile chosen during the process of FIG. 4.

In the course of evaluation according to a graphics procedure, instructions for the procedure are broadcast to the SIMD array. When tiles are used, these procedures can be chosen such that only instructions for those procedures which are associated with shapes displayed in the tile are sent to the SIMD array, preventing extraneous execution.

At block, 520, sampled parameter points are sent to the SIMD array by the sampling controller 220. For example, these parameter points are selected in view of a rate map and parameter map previously computed in a sampling pass. Alternatively, parameter points are selected by some other mechanism.

Next, blocks 530-570 illustrate the successive execution of graphics procedures by the SIMD array. As was discussed above, the procedural graphics architecture allows a full set of graphics procedures (e.g., for geometry as well as transform, and shading) to be evaluated successively on each sampled parameter point, and these evaluations are performed on the SIMD array for different parameter points in parallel. This allows the brunt of computation work to be performed in parallel without communication between the ALUs performing the evaluation, removing much of the data bandwidth need that a traditional GPU architecture would require from a geometry expansion stage to a texture mapping stage, to a shading stage, etc.

In the example procedures in this section, the procedures for geometry, texture, shading, and transform are concatenated code fragments. Separating code fragments can simplify programming and facilitate reuse. Alternatively, the various code fragments are combined into a single (e.g., compiled and optimized) program. In any case, concatenated procedures can be further improved by relying on simple data structures which remain in processor registers in a passive intermediate representation when a code fragment finishes executing, to be used by the next fragment, rather than requiring memory reads and writes. And example of one such structure for the parameters u and v and a point on a surface is:

```
struct point {
    float u, v;
    float x, y, z, w;
    float nx, ny, nz;
    float r, g, b, a;
}
```

In the example above, the sample parameters are kept in the u and v registers, with x, y, z, and w representing coordinates in 4-D space (as is commonly used in transform procedures), the nx, ny, and nz represent points in object space, the r, g, and b, represent color output in RGB color space, and a represents opacity. Thus in the process of block 520 above, the u and v registers are populated on each ALU with parameter values. In other implementations, more or fewer registers may be provided for parameter values and/or resulting sample values, if required by the procedures.

This simple structure provides a general, if verbose, medium of exchange between graphics procedures. In fact, employing a passive representation for intermediate results does not necessarily limit the flexibility of the procedures. For example, it is sometimes convenient to move viewing transformations to the end of the execution chain. With geometry, shading, and transformation all gathered in a local processor such a move becomes a trivial reordering of code. More generally, however, the use of fixed, passive structures for intermediate representation is an implementation detail related to use of concatenated code fragments, and it is not necessarily a characteristic of the GPU architecture shown in FIG. 2.

The process of blocks 530-570 is performed with reference to a (simplified) example. The example procedures describe a bi-variate surface formed by sweeping a 2D cubic function of u along the path of a second 2D function of v. For different surfaces (such as surfaces of revolution, arbitrary swept surfaces, and 3D rectangular polygons), the graphics procedures change accordingly.

To each ALU of the SIMD array, u and v values are transmitted individually. Instructions for the example procedures are then broadcast to the ALUs. Although traditional fragment shaders utilize vector operations, the operations displayed below are scalar for simplicity, but they could instead be vector operations. Moreover, in the example procedures, any variable on the left-hand side of an assignment statement is stored locally in an ALU register, and elements of the point struct described above are denoted p.var (e.g., p.x). Variables on the right-hand side of an assignment statement are either a local register value or embedded in a procedure itself.

Starting at block 530, a geometric procedure is performed to determine to where in object space the parameters map. One example of such a procedure is:

```
// initial section: bi-cubic surface
// compute u curve and normal
```

-continued

```
// 80 multiplies, 44 adds
ucmp = 1.0 - u;
var0 = u*u*u;
var1 = 3.0*u*u*ucmp;
var2 = 3.0*u*ucmp*ucmp;
var3 = ucmp*ucmp*ucmp;
xu = var0*x0 + var1*x1 + var2*x2 + var3*x3;
yu = var0*y0 + var1*y1 + var2*y2 + var3*y3;
nxu = 3*(y0 - 3*y1 + 3*y2 - y3)*u*u + 6*(y0 - 2*y1 + x2)*u + 3*(y1 - y0)
nyu = 3*( - x0 + 3*x1 - 3*x2 + x3)*u*u +6*(x0 - 2*x1 + x2)*u +3*(x1 - x0);
scln = recipsqrt(nxu*nxu + nyu*nyu);
nxu = nxu*scln;
nyu = nyu*scln;
// compute v curve and normal
... identical to u curve ...
// compute point on swept surface
p.x = xu + nxu*xv;
p.y = yv;
p.z = yu + nyu*xv;
```

Next at block, 540 a modeling transform can be included to position the object in world coordinates. In many cases this transform may have already been applied to the coefficients embedded in the procedures.

Next at block 550, texture is added. One example of such a procedure is:

```
// second section: synthetic texture
nse = nseTab2[ p.x , p.z ];
tb += abs(nse*scale);
scale /= 2.0;
// repeat for two more octaves
...
idx = thrs sin(px/period + const);
if (idx)
    p.r = red0;
    p.g = green0;
    p.b = blue0;
else
    p.r = red1;
    p.g = green1;
    p.b = blue1;
```

At block 560, a shading procedure is performed. One example of such a shading procedure is a conventional Phong shader. The Phong shader in this example differs from a typical implementation in that it operates in world coordinates with the viewpoint specified within the procedure:

Next, at block 570, the position of the sample computed in the previous sections is transformed into image coordinates. On example of such a procedure is:

```
// final procedure: viewing transform
// 17 multiplies, 1 divide, 12 adds
tx = m00*p.x + m01*p.y + m02*p.z + m03*p.w;
ty = m10*p.x + m11*p.y + m12*p.z + m13*p.w;
tz = m20*p.x + m21*p.y + m22*p.z + m23*p.w;
tw = m30*p.x + m31*p.y + m32*p.z + m33*p.w;
winv = 1.0/tw;
p.x = tx*winv;
p.y = ty*winv;
p.z = tz*winv;
```

At this point the final image sample contents of the local registers of each ALU are ready to be transferred to the tile buffer at block 580. One example of data transfer code is:

```
img[p.x,p.y].rgbaz = p.rgbaz;
``` where p.x and p.y are the coordinates of the sample point in image space and used for addressing in the tile buffer, and where rgbaz represents the RGB values of the sample as well as opacity a and z-order.

The process of FIG. 5 only computes a single image sample. The evaluations of blocks 530-570 are performed in parallel, however, for the parameter value samples given in block 520 to the SIMD array.

Several observations about the example procedures follow.

First, the example procedures described above lack a clipping function. If a pre-processor compiling this procedural description determines that no part of the resulting shape is nearer than the near clipping plane, code for clipping need not be executed.

Second, various aspects of graphics state are embedded within the procedures themselves. These include viewing parameters and modeling transformation parameters. A GPU architecture can include a pre-processor that performs on-the-fly manipulation of the procedural descriptions that are evaluated, so as to generate the implicit graphics state embedded within the procedures.

Third, although not shown above, passive representations, such as an encoded polygonal mesh may also be included and fed to a GPU.

Fourth, explicit conversion of passive representations to polygon meshes is not required. For example, a passive representation can be converted to a geometry image, which is fed to the SIMD array as a texture map. The geometric procedure for this example is a simple bi-linear interpolation, which is a built-in function of the texture mapping hardware, and a trivial specification of the shape can be used:

```
// geometry image example
// fetch position and normal
p.x = txtrX[u,v] + translateX;
p.y = txtrY[u,v] + translateY;
p.z = txtrZ[u,v] + translateZ;
p.w = 1.0;
p.nx = txtrNX[u,v];
p.ny = txtrNY[u,v];
p.nz = txtrNZ[u,v];
```

Fifth, when a setup pass is used and the order of execution is predetermined, tabulated data such as texture maps or geometry images can be prefetched and compensation for off-chip memory latency can be reliably predicted.

Sixth, whereas the example procedures are concatenated code that use registers for an intermediate passive registration in a predictable manner, procedures generated by a compiler can reassign registers in an arbitrary manner. The number of registers per ALU is still a physical limit on such reassignment. Alternatively, the compiler could produce code in which registers are paged to external memory.

Seventh, whereas some procedural architectures reflect a pixel-centric approach, in which procedural geometry produces pixel-aligned interpolated values, the example procedures above are parameter-centric. Alternatively, sampling and interpolation in the GPU architectures described herein could accommodate both pixel-centric and parameter-centric algorithms.

IV. EXAMPLE SAMPLING PROCEDURE

While the sampling controller 220 could take a naïve approach and send uniformly spaced parameter tuples from throughout the parameter space to the SIMD array 230, such an approach is typically wasteful as it results in processing of parameter samples which are not shown in the final image. It can also result in undersampling for some areas in the image domain. Thus, in some embodiments, the sampling controller takes advantage of adaptive sampling. As with any forward mapping of geometric samples, the task of adaptive sampling is to choose sample positions in the parameter domain which will adequately, but not too densely, map to image space. While different adaptive sampling procedures exist, one novel example of such a procedure is described herein.

For adaptive sampling some means of feedback from the procedure evaluation section is useful. The process described herein uses a two-pass approach. In the first pass, the scene is traversed with a sparse loop through the parameter domain of each object. A (simplified) example of such sparse pass is shown:

```
foreach(object)
{
    foreach(sparse s,t)
    {
        if ( P(s,t) in tile_{i,j} )
        {
            tag[obj,tile_{i,j}] = true
            prmMap[obj,tile_{i,j},s,t] = true
        }
        rateMap[s,t] = local sampling rate
    }
}
``` where $P(s, t)$ gives the image sample computed for the input parameter values s and t and $tile_{i,j}$ is the tile at coordinates i, j in the tile set. If evaluation of the parameter values (s, t) results in an image sample in $tile_{i,j}$, then the corresponding entry for the parameters in the "prmMap" map is set to true. The entry for $tile_{i,j}$ in the "tag" map is set to true as soon as any image sample is mapped within the tile. The rateMap entry for the parameter values (s, t) is also computed, for example, as described below.

Figure 6:
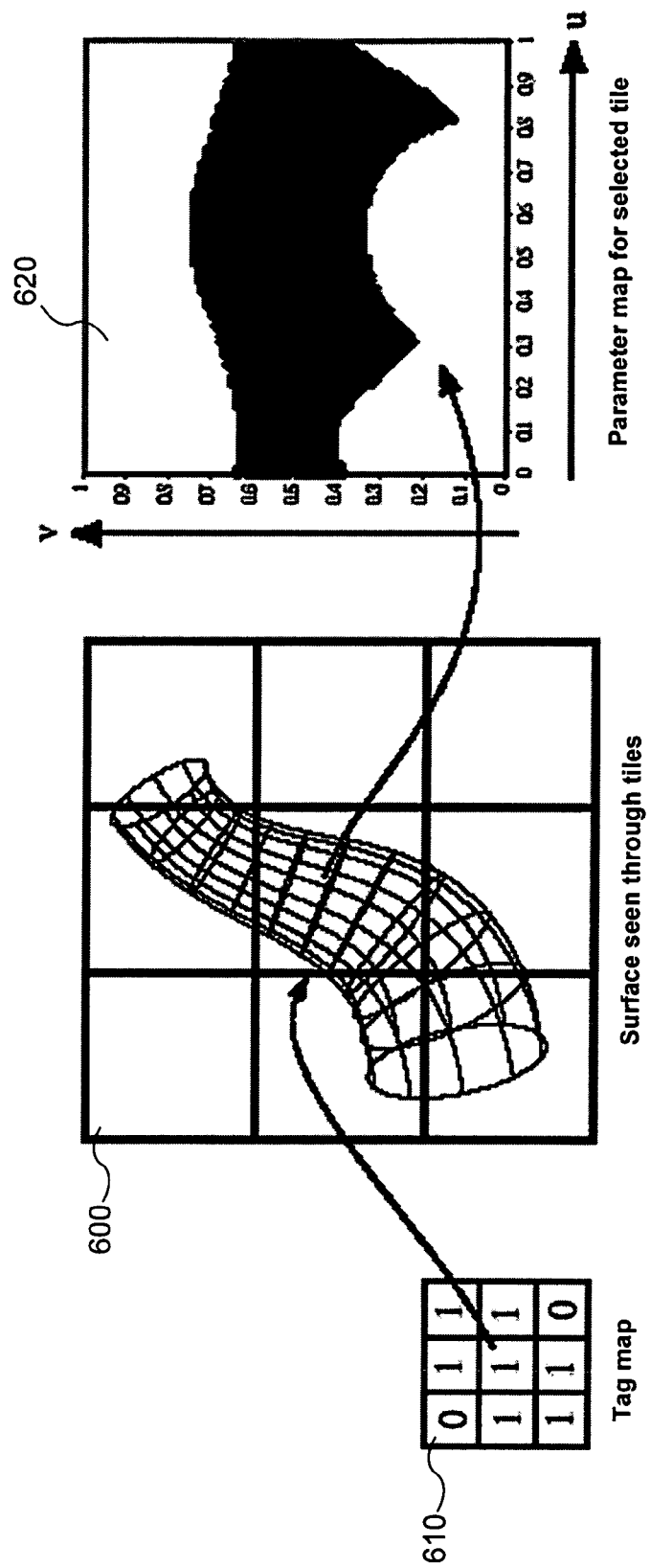
FIG. 6 is a representation of maps created and used by the sampling controller of FIG. 2 for adaptive sampling of parameters.

With the "tag" and "prmMap" structures shown, the sampling controller performs a function analogous to clipping in a traditional pipeline. FIG. 6 illustrates, for a set of tiles 600, a set of tag maps 610 and a parameter map 620 which are generated in the sparse scan. The tag map 610 indicates in which image tiles a particular shape projects. When rendering a tile, this allows the controller to skip objects whose image space projection falls completely outside the tile. (Note that the tag map illustrated in FIG. 6 has a "1" in a tile (middle right tile) which is not covered by the illustrated object. This is because the map represents an overly conservative estimate of coverage.) While the tag map 610 shows merely a 1 or a 0 depending on whether a shape is in the associated tile, alternatively, a tag map contains more information, such as which shapes are in which tiles, in order to more efficiently drive the rendering.

Parameter map 620 illustrates a clipping map in parameter space for a tile. It indicates, for a given object projected to a given tile, the region(s) of the parameter domain which result in projections inside the tile. Thus, the parameter map 620 can be used to avoid regions of the parameter domain that would result in image space projections outside the tile. Skipping over empty regions of parameter domain in the parameter map 620 helps keep the sampler from unnecessarily processing outside the current tile. Alternatively, simple minmax parameter values could be kept for each tile (indicating simple ranges of parameter values), which would be more compact. However, in testing, the parameter map 620 proves to be about 2.5 times more efficient at clipping parameter values that result in image space projections outside a given tile. In some implementations, bounds in parameter space and screen space are padded to insure that the sparse sampling does not miss tiles which should be covered. In some sense, parameter maps are analogous to "region-hit flags" described in "Real-time Procedural Textures" by Rhoads et al. in *Computer Graphics* (1992 *Symposium on Interactive 3D Graphics*) (March 1992) and "hints" mentioned in "A Programmable Pipeline for Graphics Hardware" by Olano, Ph.D. thesis, Dept. of Computer Science, The University of North Carolina at Chapel Hill, 1998.

Not illustrated in FIG. 6 is a rate map, the "rateMap" structure of the example code listing above. The rateMap structure is analogous to the texture scale factor described in Rhoads except that it reflects scaling from parameter space to image space instead of the reverse. An example procedure for computing a rate map for a parameter space and tile (as well as computing tile and parameter maps) is described with reference to FIG. 7.

Figure 7:
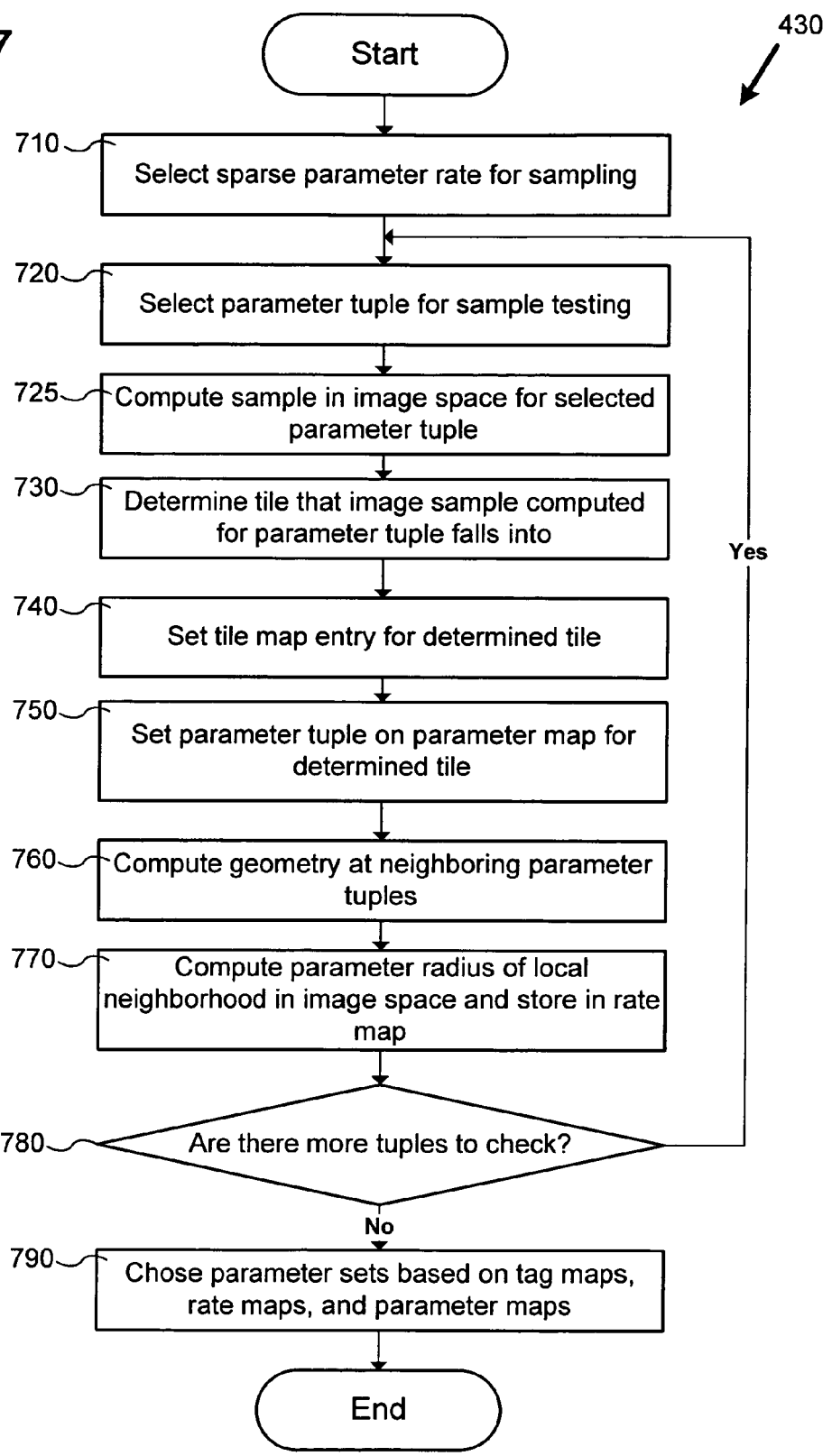
FIG. 7 is a flowchart illustrating a process performed by the sampling controller of FIG. 2 to create information used to adaptively sample parameters.

FIG. 7 is a flowchart illustrating one example of a process for generating information for use in adaptive sampling in the procedural graphics architecture 200. As such, the process of FIG. 7 is one example of a process for implementing block 430 of FIG. 4. In various embodiments, blocks illustrated in FIG. 7 may be combined, broken into sub-blocks, or omitted, and the ordering of blocks may be modified. The programmable sampling controller 220 of FIG. 2 performs the process. Alternatively, another tool performs the process. As mentioned above, the process of FIG. 7 may be performed on a tile-by-tile basis, or for all the tiles at once.

The process begins at block 710, where a sparse parameter rate for sampling is chosen. The overhead in the procedural graphics architecture for the sparse sampling to some degree depends on the resolution of the sparse loop through parameter values. A fine resolution will produce a high overhead, while an overly coarse loop can mislabel tiles as missed that are actually partially covered by an image space projection. Bounds in both parameter space and image space can be padded to avoid (or at least lessen the chance of) this, but the conservative estimates also introduce overhead. For example, in one scenario, the sparse sampling rate is experimentally derived, the sparse sampling pass produces about 25% of the final number of samples, and the overhead for the sparse sampling pass is roughly 14% of the total rendering overhead. In other scenarios, different overhead results may be observed.

The parameter tuples to be evaluated in the sparse sampling loop can be evaluated sequentially, as shown in FIG. 7. Alternatively, the parameter tuples to be evaluated in the sparse sampling loop can be evaluated in parallel in the SIMD array (with separate computation of rate, as described below).

Next, at block 720, a parameter tuple (in the examples above, the tuple is a 2-tuple, or a pair) is chosen for sample testing. At block 725, the image point to which the parameter tuple evaluates is computed. For example, the applicable geometry procedure is evaluated with the parameter tuple as input, and the resulting 3D surface point is transformed to global coordinates and then to image space.

Then at block, 730, the sampling controller determines which tile the image point (computed in block 725) falls into.

When a tag map is used, at block 740, the entry corresponding to that tile in the tag map is set. When a parameter map is used, the process then continues to block 750, where the entry for the parameter tuple is set in the parameter map associated with the tile determined at block 730.

Next, the rate map is computed by, at block 760, evaluating the geometry at neighboring parameter values and then, at block 770, computing the radius of the resulting local neighborhood in image space. The radius information is stored in a rate map. For example, the radius values for each of the two parameters of a 2-tuple for each object are stored in a small texture map whose resolution is the same as that of the sparse parameter loop. In other words, the evaluated parameter tuple has an associated entry in the rate map. The logic for sample rate determinations is implemented, for example, in a tile buffer.

In some implementations, the SIMD array allows no interprocessor communications, and the neighborhood values for a particular tuple are computed sequentially in a single ALU with results accumulated in the image tile logic. Alternatively, if interprocessor communications were allowed between ALUs of the SIMD array, the neighborhood values could be shared from ALUs evaluating other tuples in parallel.

At decision block 780, the sampling controller determines if more parameter tuples exist to check, and if so, the process repeats at block 720.

If not, the process then chooses sets of parameter values for adaptive sampling of the parameter space during rendering, based on the rate, tag, and parameter maps at block 790 and then ends. For example, during a subsequent rendering pass, the rate map is read for each object (in the architecture of FIG. 2, via the texture cache 250) and used by the sampling controller to dynamically compute the step size for loops through the parameter domain.

In a sense, the sample rate controller is a generalization of the sampling function performed by a conventional rasterizer. The sampling controller generates arrays of parameter values to serve as arguments for the graphics procedures (e.g., eval( ) methods). In some GPU architectures, the sampling controller is programmable, and the sampling procedure described above is a non-exclusive example of how the controller may be used. More generally, the controller is able to adaptively sample in parameter space over a surface, or along a line or brush stroke. The same collection of geometric procedures can produce a shaded rendering or a line drawing depending on which sampling process is prepended to the graphics procedures.

V. Analysis of Results

Depending on the procedures evaluated, the computational requirements for the GPU architecture shown in FIG. 2 typically range from one to two orders of magnitude greater than a conventional pipeline. The external bandwidth requirement for the GPU architecture of FIG. 2 is typically about one order of magnitude less than the conventional pipeline, however. In part, the higher computational requirements are due to repeated evaluation of the shape procedure (rather than pre-processing), corresponding repeated application of the viewing transform per sample, and oversampling to make adequate coverage in image space more likely. There is also a circuit real estate cost associated with programmability of the sampling controller and the routing network for the buffer. However, these results are not necessarily exclusive and alternative implementations within the framework described herein may produce improved results.

VI. Alternatives

Various alternative embodiments are now described.
(1) Rather than use a two-pass approach for adaptive sampling as described with reference to FIGS. 6 and 7, a GPU architecture may use another mechanism. For example, the GPU architecture may use an on-the-fly rate control mechanism with a separate feedback data path. If an architecture does not support direct communication from a SIMD array back to a sampling controller, such feedback is indirect.
(2) Rather than oversample to make adequate coverage in image space more likely, the GPU architecture can skip or reduce oversampling, then address gaps, seams, or other rendering artifacts during reconstruction.
(3) When tiling is used, procedures can fed to the GPU architecture of FIG. 2 on a tile-by-tile basis. Alternatively, to reduce external bandwidth associated with reading procedure descriptions on a tile-by-tile basis, the procedure descriptions can be cached or otherwise stored. As for write operation, as noted above, write operations can be cached to a full frame buffer rather than a tile buffer, whether preceding operations are performed on a tile-by-tile basis or full image basis.
(4) While techniques are described herein specifically with regard to procedural geometry, texture, and shading, alternatively other procedural descriptions which produce image samples can be used in addition to or as a substitute for these. Thus, in one example, a non-photorealistic style procedure, as an alternative or augmentation to conventional shading, may be described and evaluated.

VII. Computing Environment

The above described techniques and systems can be implemented on any of a variety of computing devices and environments, including computers of various form factors (personal, workstation, server, handheld, laptop, tablet, or other mobile), distributed computing networks, and Web services, as a few general examples. Various parts of the systems can be implemented in hardware circuitry, as well as in software 880 executing within a computer or other computing environment, such as shown in FIG. 8.

Figure 8:
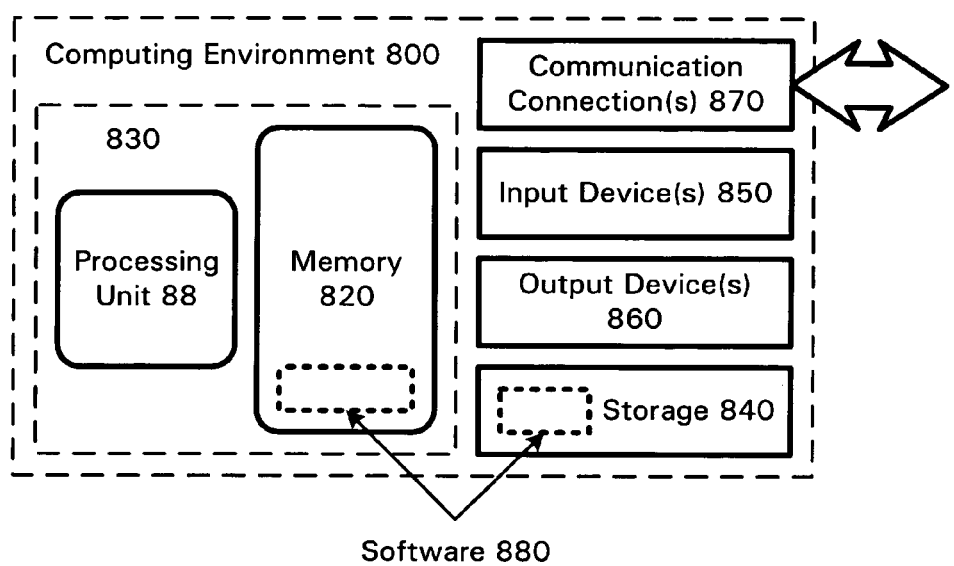
FIG. 8 a block diagram of a suitable computing environment for implementing the systems of FIG. 2.

FIG. 8 illustrates a generalized example of a suitable computing environment 800 in which the described techniques can be implemented. The computing environment 800 is not intended to suggest any limitation as to scope of use or functionality of the described techniques and systems, as the present invention may be implemented in diverse general-purpose or special-purpose computing environments.

With reference to FIG. 8, the computing environment 800 includes at least one processing unit 810 and memory 820. In FIG. 8, this most basic configuration 830 is included within a dashed line. The processing unit 810 executes computer-executable instructions. In a multi-processing system, multiple processing units execute computer-executable instructions to increase processing power. The memory 820 may be volatile memory (e.g., registers, cache, RAM), non-volatile memory (e.g., ROM, EEPROM, flash memory, etc.), or some combination of the two. In some implementations, processor resources and memory are configured as a sampling controller, ALUs in a SIMD array, and various buffers and caches, as described with reference to FIG. 2. Some part of the memory 820 stores software 880 implementing, for example, the procedural graphics techniques describe above.

A computing environment may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800.

The storage 840 may be removable or non-removable, and includes any medium which can be used to store information and which can be accessed within the computing environment 800. The storage 840 can store instructions for the software 880.

The input device(s) 850 (e.g., for devices operating as a control point) may be a touch input device, or another device that provides input to the computing environment 800. The output device(s) 860 may be any device that provides output from the computing environment 800.

The communication connection(s) 870 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools presented herein can be described in the general context of computer-readable media. Computer-readable media are any available media that can be accessed within a computing environment. By way of example, and not limitation, with the computing environment 800, computer-readable media include memory 820, storage 840, communication media, and combinations of any of the above.

The techniques and tools presented herein can be described in the general context of computer-executable instructions, such as those included in program modules, being executed in a computing environment on a target real or virtual processor. Generally, program modules include routines, programs, methods, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

The disclosed techniques and tools can be implemented in a wide variety of circuits and systems (for example, application-specific integrated circuits (ASICs), systems-on-a-chip (SOCs), systems in a package (SIPs), systems on a package (SOPs), multi-chip modules (MCMs), or other such devices). The various components of disclosed techniques and tools can be implemented (separately or in various combinations and subcombinations with one another) using a variety of different semiconductor materials, including but not limited to: gallium arsenide (GaAs) and GaAs-based materials (AlGaAs, InGaAs, AlAs, InGaAlAs, InGaP, InGaNP, AlGaSb, and the like); indium phosphide (InP) and InP-based materials (InAlP, InGaP, InGaAs, InAlAs, InSb, InAs, and the like); silicon (Si), strained silicon, germanium (Ge) and silicon- and germanium-based materials (SiGe, SiGeC, SiC, SiO2, high dielectric constant oxides, and the like) such as complementary metal-oxide-semiconductor (CMOS) processes; and gallium nitride materials (GaN, AlGaN, InGaN, InAlGaN, SiC, Sapphire, Si, and the like). In one example, the procedural graphics architecture is implemented on a single chip. The disclosed techniques and tools can also be implemented using combinations of these process technologies (for example, on multiple chips or on a single chip). The disclosed techniques and tools can also be implemented using a variety of different off-chip processes, including but not limited to low- or high-frequency printed circuit board (PCB) processes, thick- or thin-film hybrid processes, multi-layered organic processes, and low-temperature cofired ceramic (LTCC) processes.

Similarly, a variety of transistor technologies can be used to implement the disclosed techniques and tools. For example, the disclosed procedural graphics architecture techniques and tools can be implemented using bipolar junction transistor (BJT) technologies (for example, heterojunction bipolar junction transistors (HBTs)) or field effect transistor (FET) technologies (for example, pseudomorphic high electron mobility transistors (pHEMTs)). Combinations or subcombinations of these technologies or other transistor technologies can also be used to implement disclosed techniques and tools. Such combinations may be implemented on multiple chips or a single chip. For example, in one exemplary embodiment, one or more pHEMTs transistors are implemented on the same chip as one or more heterojunction bipolar transistors (HBTs).

In view of the many possible embodiments to which the principles of our invention may be applied, we claim as our invention all such embodiments as may come within the scope and spirit of the following claims and equivalents thereto.

We claim:

1. A method for generating a set of adaptively sampled parameter points to be used in rendering one or more procedural graphics routines, the method comprising:
  evaluating the one or more procedural graphics routines for parameter points in a sparse set of parameter points in a parameter domain; and
  analyzing results of the evaluating to determine information to be used in selecting the set of adaptively sampled parameter points;
  wherein:
    the one or more procedural graphics routines represent one or more objects;
    the evaluating of the one or more procedural graphics routines renders points in an image space comprising one or more tiles; and
    results of the evaluating are analyzed at least in part with respect to each of the one or more tiles.

2. The method of claim 1, wherein the analyzing the results of the evaluating comprises, at least in part, recording, for each object of the one or more objects, a set of tiles to which the one or more procedural graphics routines render.

3. The method of claim 1, wherein the analyzing the results of the evaluating comprises, at least in part, recording, for each object of the one or more objects and each tile of the one or more tiles, a set of parameter points in the parameter domain for which the one or more procedural graphics routines render points in the tile.

4. The method of claim 1, wherein the analyzing the results of the evaluating comprises, at least in part, determining a local sampling rate for the sparse set of parameter points.

5. The method of claim 4, wherein the determining the local sampling rate comprises:
  for each parameter point in the sparse set:
  evaluating the one or more procedural graphics routines at neighboring parameter points; and
  computing a radius of a local neighborhood in image space.

6. The method of claim 4, wherein the local sampling rate is recorded in a texture map.

7. The method of claim 1, wherein:
the one or more procedural graphics routines represent one or more objects;
the evaluating the one or more procedural graphics routines renders points in an image space comprising one or more tiles; and
the method further comprises selecting the adaptively sampled parameter points according to:
local sampling rate information;
for each object, information describing tiles into which the one or more procedural graphic routines map the points; and
for each object of the one or more objects and each tile of the one or more tiles, information describing which of the parameter points in the sparse set map to the tile.

8. A system, comprising a sampling controller for adaptively sampling graphics procedures, the sampling controller configured to:
select a first set of parameter tuples to be used as input in a first pass of evaluating one of the graphics procedures; and
upon receiving results of evaluation of the first set, generating a second set of parameter tuples based upon the received results;
wherein:
the graphics procedures map into an image space comprising tiles;
the graphics procedures describe one or more objects; and
the results comprise an indication for each object of the one or more objects of which tiles are mapped to by tuples in the first set of parameter tuples.

9. The system of claim 8, wherein:
the results comprise an indication for each object of the one or more objects and for each tile of the one or more tiles of which of the parameter tuples in the first set of parameter tuples map to that tile.

10. The system of claim 8, wherein the sampling controller is programmable and is configured at least in part by installing executable code on the sampling controller.

11. The system of claim 8, wherein:
at least some of the graphics procedures take points in an image space as input; and
the sampling controller is further configured to select a set of sampled points in an image space to be used as input for at least some of the graphics procedures.

12. A graphics processing unit configured to render an image defined by a series of one or more graphics procedures taking parameters as input, comprising:
a processing module;
a sampling controller configured to:
instruct the processing module to compute according to a graphics procedure from the series of one or more graphics procedures on a sparse set of parameters; and
generate a rendering set of parameters based at least in part upon output of the processing module.

13. The graphics processing unit of claim 12, wherein the output of the processing module comprises one or more tag maps, one or more parameter maps, and one or more local sampling rate maps.

14. The graphics processing unit of claim 12, wherein the sampling controller is configured such that the generated rendering set of parameters contains only parameters which are indicated by a tag map and a parameter map to map to image space when used as input into the graphics procedure from the series of one or more graphics procedures.

15. The graphics processing unit of claim 12, wherein the sampling controller is configured such that the generated rendering set of parameters contains more parameters where a local sampling rate map indicates that a smaller step size between parameters is preferable.

* * * * *